Feb. 27, 1951    S. J. COHEN    2,543,522
APPARATUS FOR PROPORTIONING LIQUIDS
Filed June 8, 1945

INVENTOR
Samuel J. Cohen
BY Robert Calvert
ATTORNEY

Patented Feb. 27, 1951

2,543,522

UNITED STATES PATENT OFFICE 2,543,522

APPARATUS FOR PROPORTIONING LIQUIDS

Samuel J. Cohen, Rochester, N. Y.

Application June 8, 1945, Serial No. 598,398.

3 Claims. (Cl. 137—78)

This invention relates to apparatus for mixing two liquids of different densities so as to produce continuously a solution of substantially uniform density and therefore constant proportions of the two original liquids.

Control of proportions of two liquids to each other is a very common requirement in chemical industry, control often effected by means of weighing tanks, by which quantities of the two liquids are weighed and subsequently mixed with each other.

The present invention provides a simple automatic means which eliminates all need of weighing and which makes possible the continuous automatic proportioning of liquids to give a finished solution of the desired proportion of each.

Briefly stated, the invention comprises the herein described combination of means controlled by the density of the mixed solution for increasing the supply of one of the liquids to a mixing vessel when the density of the resulting solution deviates substantially from the desired density in direction away from the density of the said one of the liquids, and then discontinuing the increased supply of the one liquid. In the preferred embodiment, the invention comprises a mixing vessel provided with a light permeable section constituting a window, a source of light and a photoelectric cell disposed on opposite sides of the window, means floating in the mixed liquid in the vessel at a level determined by the density of the liquid, for interrupting or alternately permitting the passage of a beam of light through the said window to the photoelectric cell, and an actuating connection from the photoelectric cell to an electrically operated unit controlling the admission of the adjusting portion of one of the liquids, so that the level of the means floating in the liquid controls the inlet of at least a portion of one of the liquids to the mixing vessel. More specifically, the preferred embodiment comprises, as the floating means, an opaque shield mounted on a hydrometer and so set that, when the density of the mixed liquid varies from that desired, the shield rises or sinks to such a level that light passes through the mixing vessel and falls upon the photoelectric cell, the photoelectric cell through a relay system controlling an electric valve or the like which operates upon the supply of a portion at least of one of the two liquids to be mixed.

Once the apparatus is adjusted as to the position of the shield upon the hydrometer and when sources of the two liquids of different densities under head are connected to the mixing vessel, my apparatus makes possible the continuous withdrawal of a mixed solution of automatically controlled density and, therefore, composition.

The apparatus is useful for instance in connection with the dilution of hydrochloric acid solution to a definite and constant concentration, as for use in absorption of additional hydrogen chloride or for shipping for industrial use. In diluting hydrochloric acid solution with water, for instance, I have supplied to the mixing vessel moderately concentrated hydrochloric acid solution and water and without further manual control have taken off for long periods of time a solution of density varying at the most by 1 to 2% or so of hydrogen chloride from that desired.

The invention will be illustrated in greater detail by description in connection with the attached drawing to which reference is made.

Figure 1:
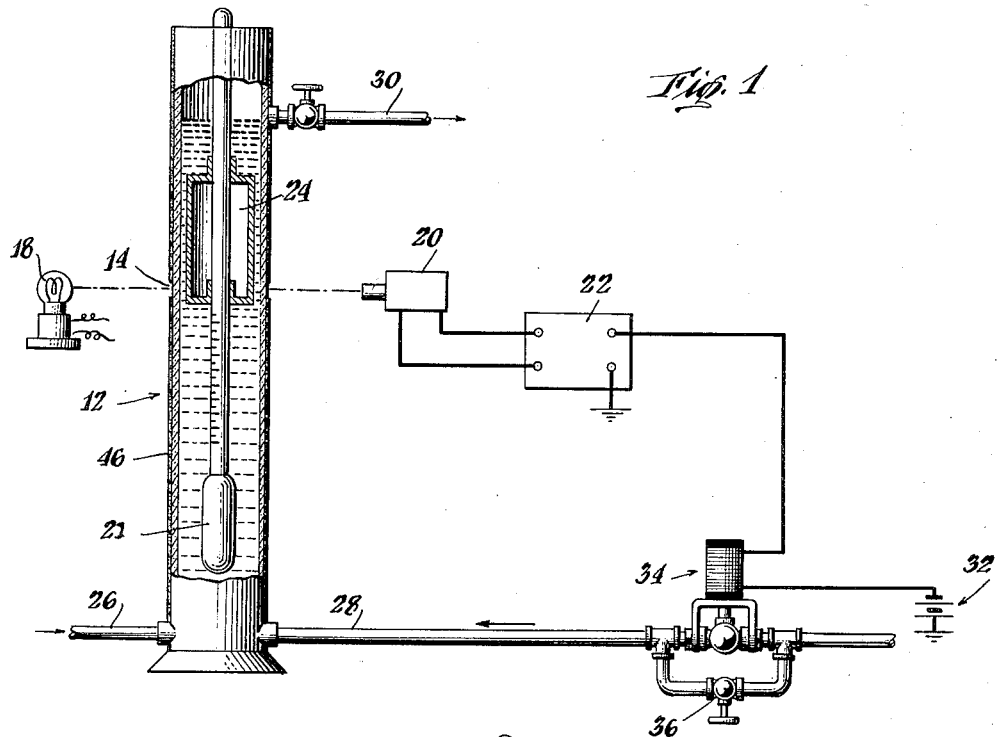
Fig. 1 is a side view, partly in section, partly broken away for clearness of illustration, and partly diagrammatic, of my preferred form of apparatus.

Parts not shown or described in detail are individually of conventional design.

There are shown a mixing vessel 12 with walls that are opaque except for the light penetrable section at the level 14 which constitutes a window through the container and through which a beam of light, as from any convenient source 18, may pass to the photoelectric cell 20 disposed beyond the window, that is, on the side opposite the source of light.

Within the cylinder there is disposed a hydrometer 21 provided with an opaque shield 24 mounted on the hydrometer in any convenient manner. Thus the shield may be mounted slidably upon the stem of the hydrometer as shown.

The mixing vessel or container is provided with inlets 26 and 28 for the liquids of different densities that are to be mixed. One inlet 26 is connected with a source of one of the liquids such as hydrogen chloride solution that is to be diluted and the other 28 with a source of the other liquid such as water. Both liquids are supplied under head to the inlets.

The mixing vessel or container is provided also with outlet 30 disposed above the inlets so that the mixed liquids rise and overflow when the solution rises into outlet 30.

The hydrometer 21 and shield are so chosen that, with the shield mounted, the hydrometer will float in the resulting solution. Also the positioning of the window 14 with respect to the liquid level in the mixing vessel 12 and the setting of the shield on the hydrometer stem are such that the shield obstructs passage of light from the source 18 through the window in the container and to the photoelectric cell when the density of the resulting solution is that desired. When, however, the density of the resulting solution is larger than desired, the hydrometer rises in the vessel 12 so that the opaque shield is raised above the lower edge of window 14 and light from the source 18 falls upon and activates the photoelectric cell 20.

The photoelectric cell operates a relay 22 in a secondary electrical circuit including a conventional source of electricity represented diagrammatically at 32. This secondary circuit, in turn, operates means for increasing the supply of the diluting or density lowering liquid admitted through inlet 28 to the mixing vessel 12. More specifically this secondary circuit activates the solenoid valve indicated generally at 34. This valve in turn controls the flow of liquid through the inlet circuit for that liquid, the circuit including the parts 28, 34 and 36, and the conventional connections shown in Figs. 1 and 2. When hydrochloric acid solution is undergoing dilution in the said vessel, the operation of the relay increases the proportion of water supplied to the mixing vessel. This means may include conventional solenoid valve and accessories shown diagrammatically at 34, the valve being lifted somewhat from its seat in a usual manner when electricity passes through the secondary circuit of relay 22 and activates the solenoid.

The inlet stem suitably includes also a by-pass line with by-pass control valve 36.

It is desirable that the opaque shield 24 in the apparatus of Fig. 1 be at least approximately as long as the distance between the lower end of the hydrometer and the bottom of the mixing vessel. When this is the case, then it is not necessary to give attention to the question of which of the liquids is called for in additional quantity at any time. The opaque shield of this length is effective in shading the photoelectric cell from the beam of light at all positions of the hydrometer except at positions in which the shield is raised so as to permit the passage of light under its lower edge from the source 18 to the electronic cell 20. The shield and photoelectric cell in this case can coact only to increase the supply of the lighter of the two liquids. When a shorter shield is used it is necessary to check the operation occasionally or at least at the start, to make certain that the hydrometer and shield have not sunk to such a position below the beam of light as to expose the cell 20 to the light and thus cause pumping in of an additional supply of the liquid of lower density even though it is already present in the mixing vessel in amount in excess of that required to give the desired density.

Figure 2:
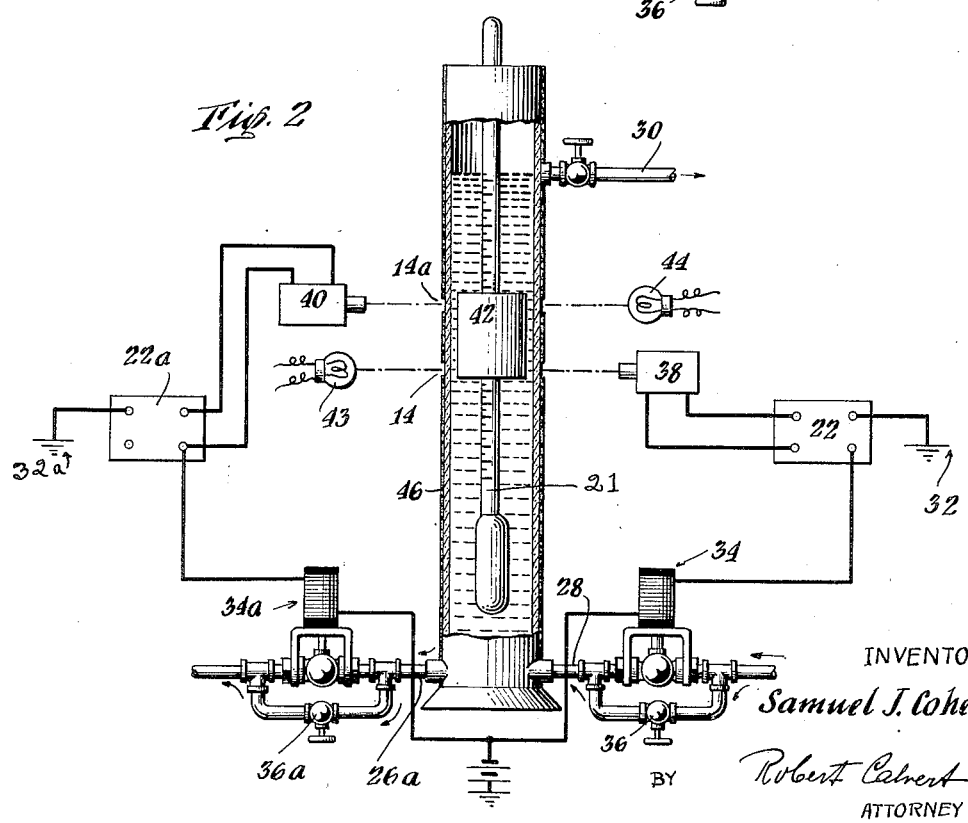
Fig. 2 is a similar view of a modified form of the apparatus.

This difficulty is avoided also by the modification of the invention shown in Fig. 2. Here there are used two photoelectric cells 38 and 40 with a relatively narrow shield 42.

The two electronic cells are preferably arranged one above the other, on opposite sides of the measuring vessel, and with separate sources 43 and 44 of activating beams of light. One cell is activated when the shield rises, and light passes through window 14, showing the requirement of more of the lighter of the two liquids; the other cell is activated when the shield sinks to below the top level of the window 14a showing the need of an additional proportion of the heavier liquid.

The photoelectric cells of Fig. 2 are connected separately to relays and secondary electrical circuits having parts corresponding to those discussed previously in connection with Fig. 1 and bearing the same reference characters, except that parts activated by the cell 40 bear the additional designation a. Thus the relay connected to cell 40 is 22a, etc.

In another modification of the invention the solenoid valve 26 in the various assemblies is replaced by an auxiliary electric pump of conventional kind (not shown) which operates upon the supply of one of the liquids and thus increases the rate at which that liquid is delivered to the mixing vessel.

In any case it is desirable to have a continuous supply of each of the liquids to the mixing vessel, with additional amounts as required of at least one of the liquids introduced by means operated by the secondary electrical circuit described, so that the automatic control serves to vary the quantity of liquid introduced for final adjustment of the density of the resulting solution without completely stopping the introduction at any time. Also the electrical valve 34 may be of either the open or shut or the modulated type permitting partial opening of the valve.

The operation of the apparatus in mixing two liquids of different densities, to give a solution of desired density and, therefore, of desired proportion of the two liquids, will be evident from the description that has been given of the apparatus.

There is selected a hydrometer which when the shield is mounted upon it will float in the liquid of desired density at such a level that the shield will register with the window in the mixing vessel. The two liquids that are to be mixed are then introduced through inlets 26 and 28 in proportions that approximate, as nearly as may be determined by manual setting of valves or regulation of pumps, the proportions which are desired in the mixed liquids. With the apparatus of claim 1, the heavier liquid is introduced in quantity somewhat greater than required so that rise of the level of the shield 24 causes a beam of light to pass through the window in the mixing vessel and under the shield and fall upon the photoelectric cell 20. The cell sets up an electrical current that closes the switch in the relay and causes the secondary electrical circuit to open the electrical valve 34 so as to increase the supply of the liquid through line 28. This increase in the supply of the liquid is continued until the density of the mixed liquid in vessel 12 falls to such a point that the shield 24 comes to obstruct the beam of light which formerly fell upon the photoelectric cell 20. At this stage, the additional supply of liquid through the electrical valve 34 is ended and not resumed until the shield again rises partly out of the beam of light and the photoelectric cell is thus activated.

With the apparatus of Fig. 2, the two liquids are again delivered to the mixing vessel through the by-pass valves 36 in about the proportions required to give the mixed liquid of desired density, as, for instance, by proper setting of the by-pass valve 36. Then, as the shield 42 rises or sinks from the level which causes the shield to obstruct the light which otherwise would be incident upon one of the photoelectric cells 38 or 40, there is activated one of the cells. The cell 40 sets up a current when more of the heavier liquid is required, the photoelectric cell 38 when more of the lighter liquid is required, to make the mixed liquid in the mixing vessel have the desired density.

The material of construction of the several parts of the apparatus may be any one of those materials which are usual in the construction of parts serving purposes of the general class for which the present parts are applied. Thus, electric lines may be of copper or aluminum with suitable insulation, the hydrometer of glass or plastic, the shield 24 of metal such as aluminum or opaque plastic or glass and the mixing vessel may be of stainless steel, hard rubber, or glass, provided the section at the window level is light permeable. When glass or normally transparent material is used for the construction of the mixing vessel, then the surface above or below the window may be coated as with black paint 46. Pipe lines and valves may be of brass or stainless steel, it being understood that the material selected should be substantially non-corrodible by the liquid which contacts that material during use of the apparatus.

Using the apparatus and method described, there have been made for long periods of time automatically controlled dilutions of a heavier with a lighter liquid and of satisfactorily constant proportions for commercial use.

The apparatus is simple in operation and is so sensitive that variations in the density of the mixed liquids are negligible for most practical purposes.

It will be understood that the shields 24 and 42 and the windows 14 and 14a may be at any desired level with respect to the surface of the liquid in the mixing vessel so long as the shields interrupt the beam of light at the critical density of the mixed liquid.

It will be understood also that it is intended to cover all changes and modifications of the example of the invention herein chosen for the purpose of illustration which do not constitute departures from the spirit and scope of the invention.

What I claim is:

1. Apparatus for mixing two liquids of different densities, to give a mixed solution of substantially constant density and uniform composition, comprising a mixing vessel, a light penetrable portion thereof constituting a window permitting passage of light through the vessel at a given level, means for delivering a beam of light to the window, a photoelectric cell disposed beyond the window in position to receive the light transmitted through the window, inlets into the mixing vessel for supplying the liquids to be mixed, an outlet above the said inlets for the solution that results from the mixing, a hydrometer disposed within the container so as to float in the said solution when the apparatus is in use and at a level determined by the density of the said solution, an opaque shield, means supporting the shield upon the hydrometer at a predetermined level with respect to the hydrometer, so that the shield shades the photoelectric cell from the beam of light when the hydrometer is floating in a solution of the desired density and, at other densities, causes the light to fall upon the photoelectric cell, an inlet circuit for admitting one of the said liquids under pressure to the mixing vessel, and an element in the inlet circuit activated by the photoelectric cell for increasing the supply of the said one of the liquids to the mixing vessel when the density of the solution being mixed at any instant is between that of the other of the said liquids and the desired density of the solution.

2. The apparatus described in claim 1, the said shield being of length from bottom to top at least approximately equal to the distance between the bottom of the hydrometer and the bottom of the mixing chamber when the hydrometer is floating at such a level that the lowest part of the shield obstructs the passage of light through the window to the photoelectric cell so that under no circumstances can the hydrometer sink so far in the liquid being mixed as to permit the beam of light passing above the top of the shield and to the photoelectric cell.

3. An apparatus for controlling the proportion of two liquids of different densities being mixed which comprises a mixing vessel, inlets respectively for admitting the two liquids to the mixing vessel, an outlet for the mixing vessel at a level substantially above the said inlets so as to define therebetween a layer of liquid of depth adequate to float a hydrometer, a hydrometer disposed within the mixing vessel, an opaque shield mounted upon the hydrometer, a transparent portion of the mixing vessel constituting a window, sources of light, two photoelectric cells arranged one above the other and each on a side of a window opposite a source of light, so that one of the photoelectric cells is activated when the shield sinks below a certain level and the other photoelectric cell is activated as the shield rises above a certain level, the photoelectric cells energizing secondary electrical circuits operating each a system for supplying an additional amount of one of the said liquids as the shield rises or falls to the position exposing one of the photoelectric cells to light from one of the said sources.

SAMUEL J. COHEN.

REFERENCES CITED

The following references are of record in the file of this patent:

UNITED STATES PATENTS

| Number | Name | Date |
| --- | --- | --- |
| 1,664,839 | Wermine | Apr. 3, 1928 |
| 1,944,243 | Kegl | Jan. 23, 1934 |
| 2,226,954 | Thorold | Dec. 31, 1940 |
| 2,262,573 | Bender | Nov. 11, 1941 |
| 2,314,822 | Quesada | Mar. 23, 1943 |
| 2,320,720 | Croft | June 1, 1943 |